United States Patent [19]
Fujishita et al.

[11] Patent Number: 4,482,595
[45] Date of Patent: Nov. 13, 1984

[54] PRIMARY BACKING OF FOAMED POLYPROPYLENE TAPES AND TUFTED CARPETS PRODUCED FROM THE SAME

[75] Inventors: Kusuo Fujishita, Kasugai; Hideshi Sakamoto, Ichihara; Tomio Yamazawa; Junichi Yamaguchi, both of Minamata, all of Japan

[73] Assignees: Chisso Corporation; Japan Polypro Backing Co. Ltd., both of Ohsaka, Japan

[21] Appl. No.: 591,496

[22] Filed: Mar. 20, 1984

[51] Int. Cl.³ .............................................. B32B 27/16
[52] U.S. Cl. ................................. 428/95; 139/420 A; 428/258; 428/259; 428/398; 428/910
[58] Field of Search ................ 428/95, 398, 258, 259, 428/910; 139/383 R, 399, 404, 420 A

[56] References Cited
U.S. PATENT DOCUMENTS

| | | | |
|---|---|---|---|
| 3,359,934 | 12/1967 | Schwartz | 112/410 |
| 3,817,817 | 6/1974 | Pickens | 428/95 |
| 3,864,195 | 2/1975 | Patterson | 428/95 |
| 4,069,361 | 1/1978 | Kumar | 428/95 |
| 4,294,876 | 10/1981 | Camden | 428/95 |

Primary Examiner—Marion E. McCamish
Attorney, Agent, or Firm—Beall Law Offices

[57] ABSTRACT

A backing for tufted carpets, having improved tufting properties such as a small penetration resistance to tufting needles, a uniform distribution of values of penetration resistance and yet superior intrinsic properties, and a tufted carpet produced from the backing are provided, which backing is produced by weaving polypropylene tape yarns oriented by stretching, these polypropylene tape yarns comprising foamed polypropylene tape yarns having a foam content of 1.0 to 20%.

6 Claims, 6 Drawing Figures

PRIMARY BACKING OF FOAMED POLYPROPYLENE TAPES AND TUFTED CARPETS PRODUCED FROM THE SAME

BACKGROUND OF THE INVENTION

1. Field of the Invention

This invention relates to a primary backing (hereinafter abbreviated to backing) for tufted carpets having improved tufting properties and tufted carpets produced from the same. More particularly, it relates to a backing for tufted carpets, comprising a polypropylene woven or non-woven fabric and having improved tufting properties, and tufted carpets produced from the same.

2. Description of the Prior Art

In the production of tufted carpets, heretofore, as a carpet backing, jute cloth (which have scarcely been currently used) and recently, woven fabrics of polypropylene tape yarns, woven fabrics of polypropylene split yarns, products obtained by needle-punching these woven fabrics with synthetic fibers or the like, non-woven fabrics of synthetic fibers produced according to spun bond process have been used. Pile yarns are pierced through these backings by using a tufting machine to prepare the so-called pile fabrics which are then fixed by back-laminating to produce tufted carpets. The process of preparing pile fabrics includes a case where loop form is left behind, as it is, in the pile and a case where the tip end of loops are cut open, to provide different kinds of tufted carpets which have been referred as loop type and cut type, respectively (see FIG. 1 and FIG. 2). Tufted carpets, whether they are of the loop type or the cut type, have an adhesive spread on the back surface of their backing for fixing piles to the backing, since the piles, as they are, slip out of the fabrics. Further, in order to hide the back surface of the tufting and make the pile fabric thick to thereby enhance the value of carpet, back laminating is carried out. Materials for this back laminating are called "secondary backing" and distinguished from the above primary backing. As the secondary backing, jute cloth, various kinds of synthetic fiber cloths, etc. are used. Further, foamed rubber, urethane resin or the like may serve at the same time for adhesion of pile for fixing and as a back-laminating backing.

In the tufting process, the pitch at which piles are planted in the backing is determined by tufting machines. The pitch between needles, as measured in the lateral direction of carpet (with direction of machine), is called "gauge" and tufting machines include those of gauges of 5/32 inch, ⅛ inch, 1/10 inch, 5/64 inch, 5/16 inch, 3/16 inch, etc. This gauge determines the pitch of piles in the lateral direction. The density of piles in the longitudinal direction of carpet (the tufting direction of machine) is called "stitch" which indicates the number of needles per 1 inch pierced through the fabric to prepare piles.

For the backing of tufted carpets, the following specific features are generally required:

(1) low penetration resistance to tufting needles;
(2) uniform distribution of values of penetration resistance on the backing;
(3) No slipping of piles out of the backing till back-laminating is complete after tufting, that is, retention of the so-called adequate pile-holding force; and
(4) retention of a stiffness to such an extent that no crease occurs at the time of rolling up or unrolling the backing in the process of tufting and no deformation even when a certain stress or heat is applied to the backing.

In the preparation of piles, tufting needles must penetrate through the backing; at that time, the less the penetration resistance and the more uniform the distribution of the values of penetration resistance, the more constant the height of piles and the more orderly their arrangement, thus affording a good pile fabric. Further, it is naturally necessary for the backing to have a pile-holding force to such an extent that the piles driven in the backing are sufficiently retained. The backing is unrolled or rolled up at the time of tufting. Further it is similarly unrolled or rolled up in the processes of application of adhesives and back-laminating, followed by applying heat for drying. Accordingly, stiffness and heat stability which are sufficient to these processes, are required.

In general, non-woven fabrics have fine fibers piled up at a uniform density in irregular directions; a low penetration-resistance to tufting needles; and a uniform distribution (needles do not penetrate through fine fibers but the clearances between fibers) (see FIGS. 3 and 4). On the other hand, the backing of polypropylene woven fabrics have more coarse constituting fibers than those of non-woven fabrics. Thus there occur cases where needles penetrate through the constituting fibers and a case where needles do not penetrate through the fibers, and a difference in the penetration resistance occurs between both the cases (see FIGS. 5 and 6). On the other hand, non-woven fabrics are weak in the pile-holding force and also weak in the stiffness of cloth due to the weakness of the constituting fibers. Whereas the backing of woven fabrics are strong both in the holding force and the stiffness of cloth, thus, it can be said that non-woven fabrics are superior in the above specific features (1) and (2), while the backing of woven fabrics are superior in the specific features (3) and (4).

In recent years, along with the trend of tufted carpets toward fine gauge (use of a tufting machine having narrow pitches between needles and increase in the number of stitches), the size of pile yarns as well as the denier of single fibers constituting the pile yarns has been reduced. In this case, the above specific features (1) and (2) are more required for the backing.

As described above, the backing of polypropylene woven fabrics have slight drawbacks in the specific features (1) and (2). As measures for the process for overcoming the drawbacks, in order to reduce the penetration resistance, (i) finishing the backing with oiling agents or (ii) reducing the denier of woven fabric-constituting fibers (raising the split quantity in the case of split yarns) has been employed, and in order to make uniform the distribution of the values of penetration resistance, (iii) making the density of woven texture higher, have been employed alone or in combination.

While these processes are respectively effective, they have of themselves limitations in respect of economy and in respect of other specific features of the backing.

Namely, according to the above process (i), with the increase in the amount of oiling agent adhered, the cost increases and depending on the kind of oiling agents, it is necessary to take into account the effect of oiling agents upon dye liquors when pile fabrics are dyed. According to the process (ii), since the denier is reduced, there is a possibility that the backing is reduced in the stiffness and strength and that it is broken; hence the reduction in the denier has a limitation. According to the process (iii), since the woven texture of the backing is caused to correspond to the pile density, the higher the pile density, the smaller the denier of tape yarns; thus the woven texture cannot help being dense, which increases the cost of the tape yarns and the weaving cost which, in turn, increase the cost of the backing. Further, even if the denier of tape yarns is reduced, the texture becomes dense; hence a problem is raised that the penetration resistance increases.

The present inventors have made extensive research on above-mentioned various problems as to the backing of polypropylene tape yarn woven fabrics and have found that when foamed tape yarns i.e. foam-containing tape yarns are used as the stock for the backing, it is possible to economically produce a backing of woven fabrics having the above specific features (1) and (2) close to those of non-woven fabrics, as well as provided with the intrinsic specific features (3) and (4).

SUMMARY OF THE INVENTION

The present invention resides in
a primary backing for tufted carpets, produced by weaving polypropylene tape yarns oriented by stretching or tufted carpets produced from the same, the tape yarns comprising foamed polypropylene tape yarns having a foam content of 0.8 to 20%.

Figure 1:
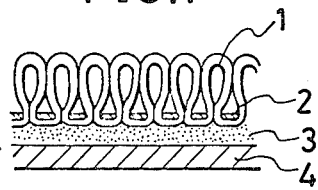
FIGS. 1 and 2 each show the schematic cross-sectional view of carpets produced using a primary backing of the prior art or the present invention (FIG. 1 shows the case of loop type and FIG. 2 shows the case of cut tape).
Figure 2:
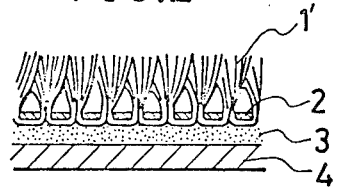
Figure 3:
FIG. 3 shows a schematic plan view of a primary backing of non-woven fabric.
Figure 4:
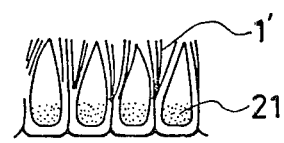
FIG. 4 shows a longitudinally cross-sectional view of a product obtained by tufting pile yarns in a primary backing of non-woven fabric.
Figure 5:
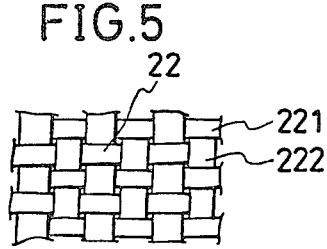
FIG. 5 shows the plan view of a backing of woven fabric of the prior art or the present invention.
Figure 6:
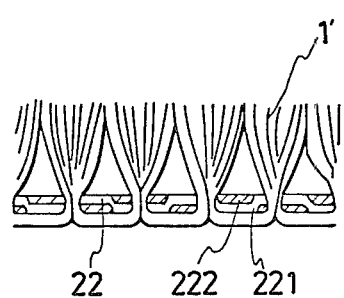
FIG. 6 shows a longitudinally cross-sectional view of a product obtained by tufting pile yarns in a backing of woven fabric.

In these figures: numeral 1 shows pile yarns of loop type; 1', pile yarns of cut type; 2, primary backing; 3, latex; 4, secondary backing; 21, primary fabric of non-woven fabric; 22, primary backing of woven fabric; 221, warp yarns; and 222, weft yarns.

DETAILED DESCRIPTION OF THE INVENTION

Since foams contained in the above foamed tape yarns form a slender clearance caused by stretching and are existent in a large number, the probability that tufting needles penetrate through the foams is so high that the penetration resistance is reduced, whereby the strength reduction of the backing due to tufting becomes small. Further, the distribution of values of penetration resistance also becomes uniform; thus pile cloths obtained by tufting the backing and further the resulting tufted carpets are improved in warp stripes, weft steps, worm-eaten defects and ripples. Further, since foams remain in the form of slender ellipsoid, the occurrences of tear of tapes in the fiber axis direction which usually occur around needle-penetration points in the stretched tapes are few and also the strength reduction of the backing due to tufting is small. These facts indicates that it is possible to reduce the amount of finishing oiling agents to be adhered.

Further, since the foamed tape yarns are of a construction having a thickness and a width unlike an aggregate of single fibers, weaving is easy and the backing obtained by weaving the yarns retains a stiffness required in the tufting process. Thus, the foamed tape yarns are deemed to be an ideal material as the stock of backing.

It is possible to reduce the foamed tape yarns of the present invention by blending a polypropylene resin with a foaming agent having a decomposition temperature of 180° to 250° C., as illustrated below, a lubricant such as metal soaps, low molecular weight polyethylene, etc. and a dispersant, subjecting the blend to film-making by means of a conventional apparatus for producing tubular films or for producing flat films, slitting the resulting film and stretching by means of a conventional stretching apparatus.

Examples of the foaming agent are azodicarbonamide, p-toluenesulfonyl semicarbazide, trihydrazinotriazine, etc.

The suitability of the foamed tape as the stock of backing is determined by the content of foams, which is, in turn, determined by the structure of the tufting carpets (gauge, number of stitches, height of piles, shape of pile yarns, and stock) and the structure of the backings (denier, thickness and width and woven texture). If the content of foams is too low, the specific features of the foamed tape yarns are not exhibited, while if it is too high, yarns having a lower stiffness and a lower strength are obtained. As will be illustrated by Examples described later, the content is generally suitable to be in the range of 0.8 to 20%, preferably about 1 to 10%.

The foam content is given by the following equation:

Foam content = $(1 - \rho_2/\rho_1) \times 100(\%)$ wherein $\rho_1$: true specific gravity of polypropylene (usually 0.91)

$\rho_2$: bulk specific gravity of foamed tape yarns (according to submerged replacement method (JIS K-7112-1977 5-1))

Further, the texture of the backing of woven fabrics will be described below. The texture of backings is determined depending on the specification of tuft, but in the aspect of the productivity (weaving properties) of backings, as the weft density (the density of weft yarns) becomes higher, the productivity decreases, while the warp density (the density of warp yarns) does not affect the productivity of backings so much. Thus, as to the warp density, considerably high densities of 18 to 28 warp yarns/inch have so far been employed. In this case, since warp yarns are thin, tufting needles penetrate between warp yarns almost without needle deflection. Namely as far as warp yarns are concerned, it can be said that their penetration resistance is considerably uniform. Thus, the improvement in backings can be attained mainly by replacing weft yarns by foamed tape yarns.

On the other hand, although the influence of warp density upon the productivity of backings is small, a low warp density is preferred in respect of operability and others. In this case, however, in order to retain the strength of the backing, the denier of the tape naturally must be increased, but tufting needles, in turn, penetrate through warp yarns; thus the improvement in the backing can be also effected by replacing warp yarns by foamed tape yarns. It goes without saying that if warp yarns and weft yarns are both replaced by foamed tape yarns, it is possible to effect both the above improvements. However, use of foamed tape yarns in place of both warp yarns and weft yarns results in a backing having a somewhat weak stiffness. Thus, replacement of either one of warp yarns or weft yarns, particularly weft yarns alone by foamed tape yarns is preferred.

Next, the specific properties of the backing prepared by weaving foamed tape yarns will be further concretely described by way of Examples.

Among the evaluations described in Examples, "finished state of pile surface" refers to an evaluation directed to defects which occur at the time of tufting. These defects include those due to tufting machines, those due to pile materials, those due to backings, etc. Among these defects, those due to backings are represented by the following four types.

(1) Warp streak: The streaks are crack-form stripes appearing on the pile surface in the longitudinal direction which are formed due to too strong a holding-force (particularly in the case where the denier of warp yarns is large) and a needle's deflection.

If the warp yarns are foamed yarns, this defect can be overcome mainly by preventing needles from deflecting. Even if the warp yarns are unfoamed the defect can also be overcome in the case where foamed yarns are used as weft yarns, since the distribution of the values of penetration resistance becomes uniform in the lateral direction (this is considered to be due to the fact that the weft yarns become soft).

(2) Weft bars: The bars refer to ones like interference pattern which are formed in the weft direction, for a mechanical reason that the feed and take-up of backing at the time of tufting are bad and due to unbalance between the backing density (the number of weft yarns) and the number of stitches in the backing.

When foamed tape yarns are used as warp yarns or weft yarns, particularly as weft yarns, the distribution of the values of penetration resistance in the longitudinal direction becomes uniform, whereby the weft bars are notably improved. When foamed tape yarns are used as weft yarns, it is possible to reduce the number of weft yarns as compared with the conventional number of weft yarns, depending on the specification of tuft.

(3) Worm-eaten: This refers to a phenomenon that piles partially fall down or lower in height due to the unevenness of the size of pile yarn, numbers of twists and the pile-holding force of backing.

In the case of backings using foamed tape yarns, the penetration resistance to needles is small, the backings retain a necessary holding force and the distribution of the values of the penetration resistance is uniform; hence the above phenomenon is improved to a large extent.

(4) Ripples: The ripples refer to a phenomenon which is similar to that of the above weft bars, but in particular, wherein curve patterns like ripples are formed due to unbalance between the backing density and the number of stitches.

In the case of foamed tape yarns, the range of the adequate number of weft yarns per the unit number of stitches is broadened as compared with that of unfoamed tape yarns; hence an improvement similar to that in the case of weft bars is obtained. Particularly in the case of pattern fabrics where there is a fear of broken patterns, the effectiveness is great.

The percentage residual tenacity was calculated according to the following equation:

$$\text{Percentage residual tenacity} = \frac{\text{Tenacity of backing after tufting}}{\text{Tenacity of backing before tufting}} \times 100(\%)$$

Evaluation of finished state of pile surface was made according to the following ranks:
A: Almost no defect
B: Few defects
C: A number of defects

EXAMPLE 1 AND COMPARATIVE EXAMPLE 1

Foamed tape yarns having a foam content of 5% were prepared by film-making by means of a T-die, slitting and hot stretching. Nylon pile yarns were tufted in a backing, which was made by using the above foamed yarns as weft yarns, to prepare a pile fabric having a gauge of 1/10 inch. As a comparative example, a nylon pile fabric was prepared under the same conditions as the above, from a backing which was made by using conventional tape yarns as both warp yarns and weft yarns. The specification conditions and the evaluation of the resulting pile fabrics are shown in Table 1.

TABLE 1

| | | Example 1 | Compar. ex. 1 |
|---|---|---|---|
| Specification of backing | Warp yarns | 400 d flat yarns (unfoamed) 24 ends/inch | 400 d flat yarns (unfoamed) 24 ends/inch |
| | Weft yarns | 850 d foamed flat yarns 13 ends/inch | 850 d flat yarns (unfoamed) 13 ends/inch |
| Tufting conditions | | Loop type; pile length, 4.0 m/m; gauge, 1/10 inch; stitch, 9.5 | Loop type; pile length, 4.0 m/m; gauge, 1/10 inch; stitch, 9.5 |

| Evaluation | | Before tufting | After tufting | Before tufting | After tufting |
|---|---|---|---|---|---|
| Backing tenacity in the longitudinal direction | Kg/5 cm | 80 | 76 | 78 | 71 |
| Percentage residual tenacity of the same | % | | 95 | | 91 |

TABLE 1-continued

| | | | | | |
|---|---|---|---|---|---|
| Tenacity of backing in the weft direction | Kg/5 cm | 52 | 38 | 58 | 28 |
| Percentage residual tenacity of the same | % | | 73 | | 48 |
| Finished state of pile surface | Warp streaks | A | | B | |
| | Weft bars | A | | B | |
| | Worm-eaten | A | | B | |
| | Ripples | A | | B | |
| | Collective eval. | A | | B | |
| | Supplement | Improving effect in "worm-eaten" is particularly great. | | | |

As seen from the evaluation in Table 1, since a foamed backing was used, the finished state of pile surface was improved to a large extent as compared with the case where a conventional flat yarn backing was used. Further, it is apparent that the percentage residual tendency is large enough to endure use.

EXAMPLE 2 AND COMPARATIVE EXAMPLE 2

Tufting tests were carried out in the same manner as in the above examples except that foamed yarns having a foam content of 10% were used for backing. The results are shown in Table 2.

As apparent from Table 2, the finished state of pile surface was improved according to the present invention. Further it is seen that the tenacity reduction due to tufting is small so that the resulting pile fabric is sufficiently usable.

EXAMPLE 3 AND COMPARATIVE EXAMPLE 3

Tests were carried out in the same manner as in Example 1 except that foamed yarns having a foam content of 8% were used for backing. Comparative example 3 is an example wherein unfoamed yarns corresponding to yarns of Example 3 were used. The results are shown in Table 3.

TABLE 2

| | | Example 2 | | Compar. ex. 2 | |
|---|---|---|---|---|---|
| Specification of backing | Warp yarns | 400 d flat yarns (unfoamed) 24 ends/inch | | 400 d flat yarns (unfoamed) 24 ends/inch | |
| | Weft yarns | 600 d foamed flat yarns 16 ends/inch | | 600 d flat yarns (unfoamed) 16 ends/inch | |
| Tufting conditions | | Loop type; pile length, 4.0 m/m; gauge, 1/10 inch; stitch, 12.0 | | Loop type; pile length, 4.0 m/m; gauge, 1/10 inch; stitch, 12.0 | |
| Evaluation | | Before tufting | After tufting | Before tufting | After tufting |
| Backing tenacity in the longitudinal direction | Kg/5 cm | 80 | 74 | 78 | 69 |
| Percentage residual tenacity of the same | % | — | 92 | — | 88 |
| Tenacity of backing in the weft direction | Kg/5 cm | 48 | 35 | 50 | 30 |
| Percentage residual tenacity of the same | % | — | 73 | — | 60 |
| Finished state of pile surface | Warp streaks | A | | B | |
| | Weft bars | A | | B | |
| | Worm-eaten | A | | B | |
| | Ripples | A | | B | |
| | Collective eval. | A | | B | |
| | Supplement | Improvement effects of "warp streaks" and "worm-eaten" are particularly great. | | | |

Table 3.

TABLE 3

| | | Example 3 | Compar. ex. 3 |
|---|---|---|---|
| Specification of backing | Warp yarns | 400 d formed flat yarns 24 ends/inch | 400 d flat yarns (unformed) 24 ends/inch |
| | Weft yarns | 600 d foamed flat yarns 18 ends/inch | 600 d flat yarns (unfoamed) 18 ends/inch |
| Tufting conditions | | Cut type; pile | Cut type; pile |

TABLE 3-continued

| Evaluation | | length, 9.0 m/m; gauge, 1/10 inch; stitch, 14 | | length, 9.0 m/m; gauge, 1/10 inch; stitch, 14 | |
| --- | --- | --- | --- | --- | --- |
| | | Before tufting | After tufting | Before tufting | After tufting |
| Backing tenacity in the longitudinal direction | Kg/5 cm | 65 | 60 | 70 | 62 |
| Percentage residual tenacity of the same | % | | 92 | | 89 |
| Tenacity of backing in the weft direction | Kg/5 cm | 50 | 25 | 50 | 20 |
| Percentage residual tenacity of the same | % | | 50 | | 40 |
| Finished state of pile surface | Warp streaks | A | | A | |
| | Weft bars | A | | B | |
| | Work-eaten | A | | A | |
| | Ripples | A | | B | |
| | Collective eval. | A | | B | |
| | Supplement | Improvements in weft bars and ripples are particularly great. | | | |

As apparent from Table 3, the finished state of pile surface was improved to a large extent due to use of foamed backing. Further, it is apparent that the percentage residual tenacity is large enough to endure use.

EXAMPLE 4

Flat yarns having varied foam contents were prepared, and backings woven using the above flat yarns as weft yarns and backings after tufting were evaluated. Test conditions in this case are as follows:

Backing:
   Warp yarns, 400 d (denier) flat yarns (unfoamed) 24 ends/inch
   Weft yarns, 600 d foamed flat yarns 18 ends/inch
Tufting conditions:
   Cut type, pile length 4 m/m, gauge 1/10, stitch 14
The results are shown in Table 4.

TABLE 4

| Experiment No. | 4-1 | 4-2 | 4-3 | 4-4 | 4-5 | 4-6 | 4-7 | 4-8 | 4-9 |
| --- | --- | --- | --- | --- | --- | --- | --- | --- | --- |
| Foam content (%) | 0.55 | 0.95 | 2.1 | 4.8 | 9.8 | 15.5 | 19.8 | 23.7 | 31.0 |
| Evaluation*(1) of backing (stiffness) | A | A | A | A | A-B | B | B | C | C |
| Finished state*(2) of pile surface | B | A | A | A | A | A | A | C | C |

*(1)The evaluation standards of backing (stiffness) are as follows:
A This refers to the stiffness of a backing wherein unformed flat yarns are used as both warp yarns and weft yarns.
B Stiffness is somewhat weak but endurable to practical uses.
C Stiffness is too weak to endure practical uses.
*(2)Finished state of pile surface: Weft fars and ripples were improved in the range of the foam content of 0.95 to 19.8%.

As seen from the above results, in the case of a foam content of about 0.5%, the finished state of pile surface is not improved, but in the case of the content in the range of about 1 to 10%, a sufficient stiffness is obtained and the finished state of pile surface is also improved. If the foam content exceeds 10%, the stiffness of backing becomes weak, but it is still endurable to practical uses up to 20% and the finished state of pile surface is also good. However if the foam content exceeds 20%, the stiffness of backing becomes extremely weak and the finished state of pile surface is also inferior due to crease formation at the time of tufting; hence the resulting product is not endurable to use.

EXAMPLE 5

Tufting tests were carried out using foamed yarns as weft yarns and using foamed yarns or unfoamed yarns as warp yarns and also varying their densities. Tufting conditions and the results are shown in Table 5.

TABLE 5

| | Experiment No. | | | | | |
| --- | --- | --- | --- | --- | --- | --- |
| | 5-1 | 5-2 | 5-3 | 5-4 | 5-5 | 5-6 |
| Specification of backing | | | | | | |
| Warp yarns | 24 ends/inch (400 d) unfoamed foamed | | 18 ends/inch (600 d) unfoamed foamed | | 14 ends/inch (950 d) unfoamed foamed | |
| Weft yarns | 13 ends/inch (850 d) foamed | | Same as left | | Same as left | |
| Tufting conditions | Loop type; pile length, 4.0 m/m; gauge, 1/10 inch; stitch, 9.5 | | Same as left | | Same as left | |
| Evaluation | | | | | | |

TABLE 5-continued

|  | Experiment No. | | | | | |
| --- | --- | --- | --- | --- | --- | --- |
|  | 5-1 | 5-2 | 5-3 | 5-4 | 5-5 | 5-6 |
| Finished state of pile surface | A | A | B | A | B | A |
| Finished state of pile surface |  |  |  |  |  |  |
| Warp streaks | A | A | A | A | A | A |
| Weft bars | A | A | A | A | A | A |
| Worm-eaten | A | A | B | A | B | A |
| Ripples | A | A | A | A | A | A |
| Collective eval. | A | A | A-B | A | A-B | A |
| Penetration state of tufting needless through warp yarns | Almost none | Same as left | Scarce | Many | Somewhat many | Many |

Supplementary explanaton of Table 5:

When the warp density is 24 ends/inch, tufting needles penetrate between warp yarns, and nevertheless there is almost no needle deflection, since the denier of the warp yarns is small; hence the pile density is uniform and the finished state of pile surface is also good. With the decrease in the warp density, warp yarns become coarse, the width of needle deflection becomes broad, the pile density becomes nonuniform and the finished state of pile surface becomes inferior. In the case where foamed yarns are used, since tufting needles penetrate through yarns, there is no needle deflection and the finished state of pile surface is also good.

What we claim is:

1. A primary backing for tufted carpets, produced by weaving polypropylene tape yarns oriented by stretching, which polypropylene tape yarns comprise foamed polypropylene tape yarns having a foam content of 1.0 to 20%.

2. A primary backing according to claim 1, wherein unfoamed polypropylene tape yarns are used as warp yarns of said backing and said foamed polypropylene tape yarns are used as weft yarns of said backing.

3. A primary backing according to claim 1, wherein said foamed polypropylene tape yarns are used as both warp yarns and weft yarns of said backing.

4. A tufted carpet produced by the use of a primary backing prepared by weaving polypropylene tape yarns oriented by stretching, which polypropylene tape yarns comprise foamed polypropylene tape yarns having a foam content of 1.0 to 20%.

5. A tufted carpet according to claim 4, wherein unfoamed polypropylene tape yarns are used as warp yarns of said backing and said foamed polypropylene tape yarns are used as weft yarns of said backing.

6. A tufted carpet according to claim 4, wherein said foamed polypropylene tape yarns are used as both warp yarns and weft yarns of said backing.

* * * * *